April 6, 1943.　　A. L. WHITELEY ET AL　　2,315,916
ELECTRIC WELDING SYSTEM
Original Filed Jan. 5, 1940　　2 Sheets-Sheet 2

Inventors:
Austyn L Whiteley,
Bertram G. Higgins,
by Harry E. Dunham
Their Attorney.

Patented Apr. 6, 1943

2,315,916

UNITED STATES PATENT OFFICE 2,315,916

ELECTRIC WELDING SYSTEM

Austyn L. Whiteley and Bertram G. Higgins, Rugby, England, assignors to General Electric Company, a corporation of New York Original application January 5, 1940, Serial No. 312,520, now Patent No. 2,269,967, dated January 13, 1942. Divided and this application January 29, 1941, Serial No. 376,542. In Great Britain March 20, 1939

5 Claims. (Cl. 219—4)

Our invention relates to electric translating apparatus and more particularly to electric resistance welding equipment.

This application is a division of our copending patent application Serial No. 312,520, filed January 5, 1940, entitled "Electric valve control system" and which is assigned to the assignee of the present application. Various features of the electric valve control system described herein are broadly claimed in the above identified application Serial No. 312,520 (now Patent No. 2,269,967, dated January 13, 1942).

It is an object of our invention to provide a new and improved electric resistance welding system.

It is another object of our invention to provide a new and improved electric translating system for energizing a welding circuit and which includes apparatus for transmitting different amounts of current to the welding circuit during predetermined intervals, and which also provides apparatus for increasing the pressure applied to the welding electrodes during a period of low current intensity which follows a period of relatively high current intensity.

It is a further object of our invention to provide a new and improved method of electric resistance welding.

Figure 1:
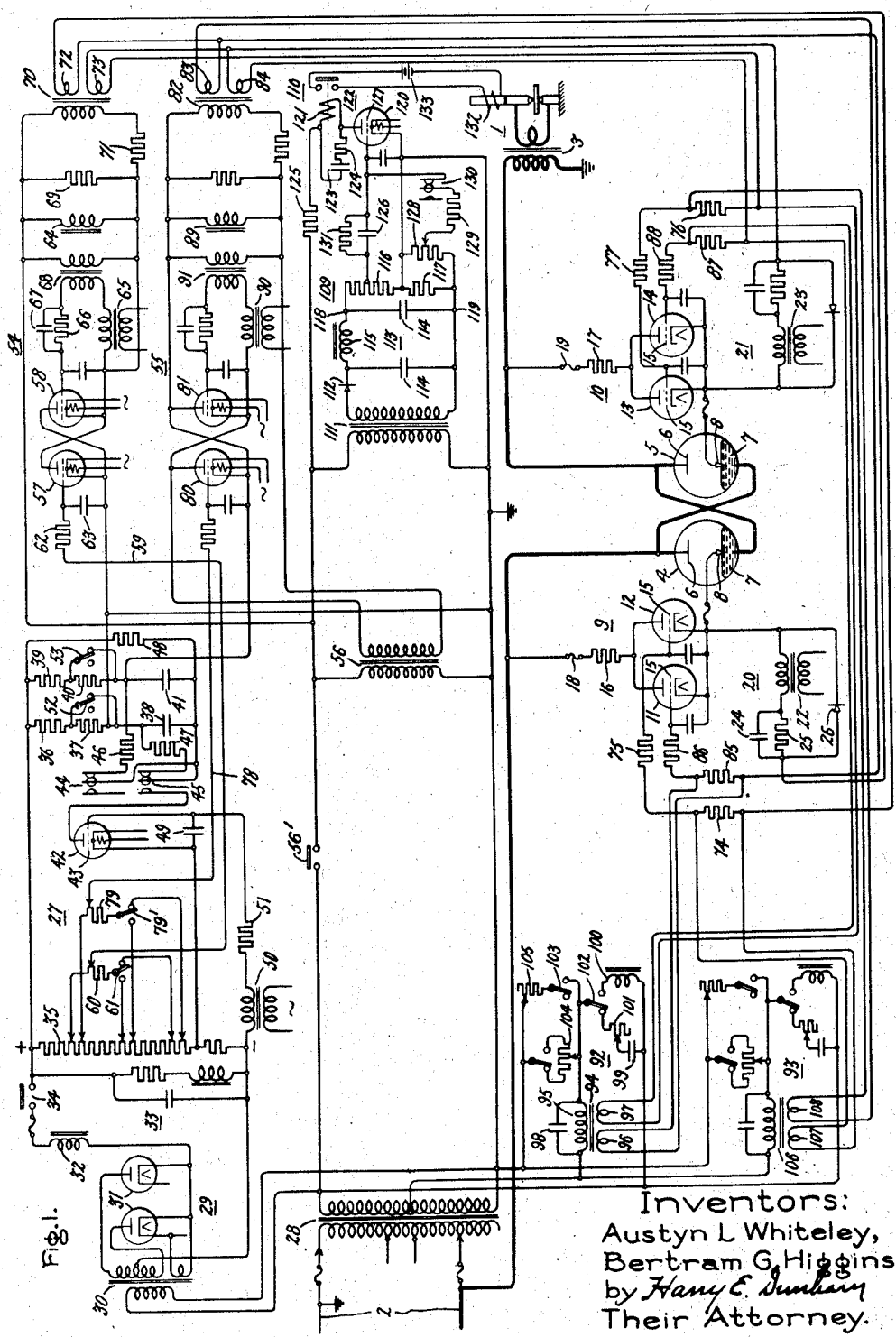
Figure 2:
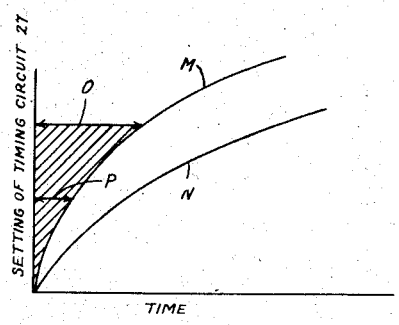
Figure 3:
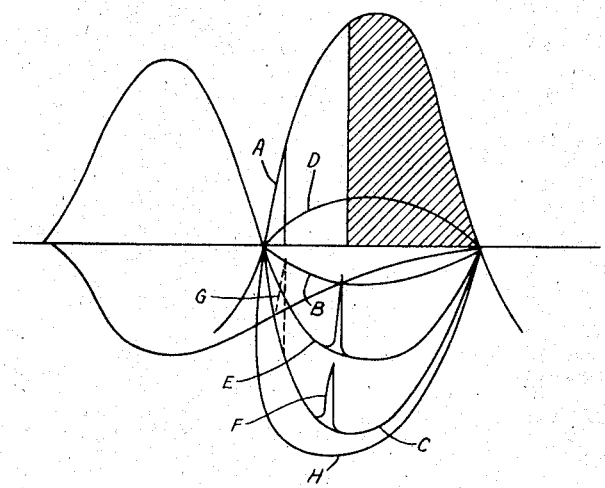

For a better understanding of our invention, reference may be had to the following description, taken in connection with the accompanying drawings, and its scope will be pointed out in the appended claims. Fig. 1 diagrammatically illustrates an embodiment of our invention as applied to a welding system for energizing an alternating current welding circuit from an alternating current supply circuit, and Figs. 2 and 3 represent certain operating characteristics thereof.

Referring now to Fig. 1 of the accompanying drawings, we have diagrammatically illustrated our invention as applied to a welding system for energizing a load circuit, such as a welding circuit, from an alternating current supply circuit 2 through a transformer 3 and a pair of reversely connected electric valve means 4 and 5. If desired, one terminal of the primary winding of the transformer 3 may be connected to ground and one terminal of the alternating current supply circuit may also be connected to ground, as shown in the drawings. The electric valve means 4 and 5 are preferably of the type employing an ionizable medium, such as a gas or a vapor, and each comprises an anode 6, a cathode such as a mercury pool cathode 7, and may comprise make-alive or immersion-ignitor control members 8 of semi-conducting material, such as boron-carbide or silicon-carbide, associated with the mercury pool cathodes. These control members require the transmission of a current of predetermined value therethrough in order to initiate an arc discharge between the anode and the cathode.

We provide a pair of excitation circuits 9 and 10 associated with the electric valve means 4 and 5, respectively, for transmitting unidirectional current to the control members 8 thereof to render the valves conductive and hence to effect energization of the welding circuit 1. Excitation circuits 9 and 10 include electric valves or electric discharge devices 11 and 12, and 13 and 14, respectively. These electric discharge devices are also preferably of the type employing an ionizable medium and each comprises a control grid 15. The excitation circuits 9 and 10 may be connected to be responsive to the anode voltage of the associated electric valves 4 and 5, respectively, and may be connected to the respective anodes through current limiting resistances 16, 17 and current protective means such as fuses 18 and 19, respectively.

To render the electric discharge devices 13 and 14 conductive, we provide grid circuits 20 and 21, respectively. These grid circuits include means for impressing on the control grids 15 thereof suitable biasing potentials tending to maintain the electric discharge devices nonconducting. These biasing means may comprise transformers 22 and 23, respectively, and may be energized from any suitable source of alternating current of proper frequency and phase displacement, preferably having a phase displacement of 180 electrical degrees with respect to the applied anode-cathode voltages of electric valves 4 and 5, respectively. The transformers 22 and 23 may be energized from the alternating current circuit 2 through suitable phase shifting apparatus (not shown). A suitable source of substantially constant negative unidirectional biasing potential may be employed in each of the grid circuits 20 and 21 and may comprise a parallel connected capacitance 24 and a resistance 25, both of which are connected in series relation with a unidirectional conducting device 26 and which are energized from transformer 22 or 23.

Generally speaking, we provide, as explained hereinafter, new and improved electric valve timing circuits for controlling the conductivities of the electric valves 4 and 5 so that these valves conduct current during predetermined intervals of time, or, in other words, a predetermined number of cycles of the voltage of the alternating current circuit 2 to effect energization of the welding circuit 1 during a corresponding interval of time. In addition, we provide a master timing circuit which generates a number of electrical quantities for determining independently separate or distinct intervals of conduction by the electric valve means 4 and 5 and which operate in conjunction with current or heat control apparatus to transmit different amounts of current to the welding circuit 1 during the respective intervals. The system is capable of responding to transmit different amounts of current to the welding circuit 1 during contiguous intervals in response to a single circuit controlling operation.

As a means for producing a number of electrical timing quantities, we provide a master timing circuit 27. The timing circuit 27 may be energized from the alternating current circuit 2 through a transformer 28 and a biphase rectifier 29 comprising a transformer 30, electric valves 31, a smoothing inductance 32, and a filter circuit 33. A controlling contactor 34 may be connected in series relation with the positive terminal of the rectifier 29 and a suitable potentiometer comprising a resistance 35 may be connected across the output terminals of the rectifier 29. In order to produce a number of electrical timing quantities, we provide in parallel a pair of electric paths comprising resistances 36 and 37 and a capacitance 38, and resistances 39 and 40 and a capacitance 41. These paths or circuits are connected to the positive terminal of the output circuit of rectifier 29 and are connected to be charged from the output circuit through a suitable electric discharge device 42 preferably of the type employing an ionizable medium, such as a gas or a vapor, and having a control grid 43. Suitable initiating switches 44 and 45 are connected in series relation with the anode-cathode circuit of the electric discharge device 42 and serve to initiate the charge of the capacitances 38 and 41 from the direct current output circuit of rectifier 29, and hence initiate the generation of the electrical timing quantities. The initiating switches 44 and 45 may be arranged so that in their normal positions the capacitances 41 and 38, respectively, are short circuited through resistances 46 and 47, respectively which constitute discharge circuits therefor. The resistance 48 of relatively high ohmic value may be connected across the circuits including capacitances 38 and 41 to prevent the voltages of these circuits from attaining dangerously high values. A capacitance 49 is connected across the cathode and the grid of electric discharge device 42 to absorb extraneous transient voltages. In order to render the electric discharge device 42 conductive at a precise time during a cycle of voltage of circuit 2, we employ a transformer 50 preferably of the type designed to produce a voltage of peaked wave form and which is connected in circuit with the control grid 43. A current limiting resistance 51 may be connected in series relation with the grid 43. Transformer 50, if desired, may be connected to the alternating current circuit 2 through a suitable phase shifting device (not shown). This phase shifting device, of course, may be adjusted to adjust or control the time during the cycles of voltage at which the electric discharge device 42 is rendered conductive.

Switches 52 and 53 may be connected across the resistances 39 and 40, respectively, to control the time constants of the charging circuit for capacitances 38 and 41 and hence to control the duration of the electrical timing quantity. In this manner, it is possible to obtain ready control of the periods of conduction by the electric valve means 4 and 5.

To produce trains of cycles of alternating current in response to the electrical timing quantities generated by the master timing circuit 27, we provide control circuits 54 and 55 which are energized from a suitable source of alternating current correlated in phase and frequency with respect to the voltage of circuit 2. Of course, the control circuits 54 and 55 may be connected to circuit 2 by means of an insulating transformer 56 and through a control switch 56', if desired.

Control circuit 54 comprises a pair of electric discharge devices 57 and 58 preferably arranged in a leading and following relationship, respectively. The period of conductivity of the electric discharge devices 57 and 58 is determined by the electrical timing quantity derived from the master timing means 27 through conductor 59 and a voltage divider 60 connected to the main voltage divider of the master timing means. A switch 61 may be employed to adjust or vary the interval of time during which the electric valve 57 is rendered conductive. The current limiting resistance 62 and the transient absorbing capacitance 63 may be connected in the grid circuit of the electric discharge device 57. The electric discharge device 58 is arranged to follow the discharge device 57, that is, to be rendered conductive during the following half cycle after each half cycle of conduction by the electric discharge device 57 since the devices are arranged inversely in parallel. Furthermore, the electric discharge devices 57 and 58 are arranged to conduct current from the supply circuit 2 through transformer 28 and through an inductance 64. Since the discharge devices 57 and 58 are arranged inversely in parallel, alternating current will be transmitted through the inductance 64 for a number of cycles determined by the timing quantity derived from the master timing means 27. A suitable source of biasing potential, such as an alternating biasing potential preferably displaced 180 electrical degrees with respect to the anode-cathode voltage of discharge device 58, is impressed on its grid by means of a transformer 65. A self-biasing circuit comprising a resistance 66 and a capacitance 67 is also employed. Superimposed on the two biasing potentials there is also provided a voltage sufficient to overcome the effect of the biasing potentials to render the discharge device 58 conductive due to the transmission of current by the discharge device 57. This control voltage may be obtained by means of a transformer 68 which is connected to be energized in response to the voltage appearing across the inductance 64. A resistance 69 of relatively high ohmic value is connected across the inductance 64 to maintain the voltage variations across the terminals thereof within a reasonable range of values. In order to impress on the control grids 15 of the electric discharge devices 12 and 13 trains of half cycles or cycles of alternating voltage corresponding in length to one of the electrical timing quantities generated by circuit 27, we provide a transformer 70 energized through a resistance 71 and having a pair of secondary windings 72 and 73. Secondary winding 72 is connected to grid 15 of discharge device 12 through resistances 74 and 75, and secondary winding 73 is connected to grid 15 of discharge device 13 through resistances 76 and 77.

Control circuit 55 is substantially similar to control circuit 54 and transmits trains of half cycles or cycles of alternating voltage corresponding to a different electrical timing quantity derived from the master timing circuit 27 through a circuit including conductor 78, a voltage divider 79 and a switch 79'. The control circuit 55 includes a pair of reversely connected electric valve means 80 and 81 and impresses upon a transformer 82 trains of half cycles or cycles of voltage to render the electric discharge devices 11 and 14 conductive during a period of time corresponding to the timing quantity derived from the master timing circuit 27. The transformer 82 comprises secondary windings 83 and 84, the former of which is connected to grid 15 of electric discharge device 11 through resistances 85 and 86, and the latter of which is connected to grid 15 of discharge device 14 through resistances 87 and 88. The control circuit 55 is connected to render discharge devices 11 and 14 and hence electric valves 4 and 5 conductive during a predetermined interval of time by impressing on the control grids 15 of the discharge devices a train of cycles of alternating potential to render the electric valves 4 and 5 conductive during a corresponding number of cycles. In control circuit 55 the discharge devices 80 and 81 are arranged in leading and following relationship to transmit alternating current through the inductance 89. An alternating biasing or half-off potential may be provided by transformer 90, and a voltage for rendering the discharge device 81 conductive in response to the conduction by discharge device 80 is obtained by means of the transformer 91. Other elements of the control circuit 55 correspond in function to that described above in connection with the control circuit 54.

In order to control the amount of current transmitted to the welding circuit 1 during the intervals of time established by the master timing circuit 27, we provide control circuits 92 and 93. The control circuits 92 and 93 are sometimes referred to as heat control circuits. Circuits 92 and 93 are associated with control circuits 55 and 54, respectively, to introduce in grid circuits 20 and 21 alternating voltages of peaked wave form to determine the time during the cycles of voltage applied to electric valves 4 and 5 at which the electric valves are rendered conductive. Considering control circuit 92 in particular, this circuit comprises a suitable means such as a saturable inductive transformer 94 having a primary winding 95 and a pair of secondary windings 96 and 97. A suitable capacitance 98 may be connected across the primary winding 95 of the transformer 94 in order to compensate for the magnetizing current required thereby. In order to introduce the alternating voltage of peaked wave form generated by transformer 94 into the grid circuits 20 and 21, windings 96 and 97 are connected across resistances 85 and 87, respectively, so that the voltages of peaked wave form effectively act in series relation with respect to the other aforementioned control potentials of these grid circuits. To control or adjust the phase of the alternating voltage of peaked wave form generated in windings 96 and 97, we provide suitable phase shifting circuits preferably of the static impedance type and which may comprise a capacitance 99, an inductance 100, a resistance 101, and switches 102 and 103. Other suitable variable resistances 104 and 105 may also be employed to adjust, control or preselect the phase position of the voltages of peaked wave form generated in windings 96 and 97. It will be noted that the left-hand terminal of the primary winding of transformer 94 is connected to the mid-connection of the secondary winding of transformer 28, and that by operation of the switch 103 there is provided means for connecting the primary winding 95 selectively to alternating voltages 180 electrical degrees displaced from each other.

Control circuit 93 is similar in all substantial respects to circuit 92. This circuit comprises a transformer 106, preferably of the type designed to produce a voltage of peaked wave form, and comprises secondary windings 107 and 108 connected across resistances 74 and 76 in grid circuits 20 and 21, respectively. In other words, the alternating voltages of peaked wave form generated in secondary windings 107 and 108 determine the time during the half cycles of voltage of circuit 2 at which the electric discharge devices 12 and 13 are rendered conductive, and hence control the amount of current transmitted to the welding circuit 1 by the electric valve means 4 and 5 during one of the intervals of time established by control circuit 54 and the master timer 27. In other details, the control circuit 93 is exactly the same as circuit 92. Circuit 93 includes means for controlling the phase of the voltage impressed on the primary winding of transformer 106 and hence controls the phase of the alternating voltages of peaked wave form induced in secondary windings 107 and 108.

In many electric welding applications, it is desirable to control the pressure exerted by the electrodes at a definite time during the welding operation. We employ a circuit 109 for operating a control circuit 110 which, in turn, controls apparatus for varying the pressure exerted by the welding electrodes. The circuit 109 comprises a transformer 111, a suitable rectifying device 112 and a filter circuit 113 comprising capacitances 114 and an inductance 115. A suitable voltage divider including resistances 116 and 117 may be connected across the direct current terminals 118 and 119. In order to effect energization of the control circuit 110 at the desired time during the welding cycle and hence to increase the pressure between the welding electrodes at the desired time, we provide in circuit 109 an electric discharge device 120 for energizing the actuating coil 121 of a relay 122. The electric discharge device 120 is preferably of the gaseous type having its anode-cathode circuit connected in series relation with the actuating coil 121 of relay 122. A capacitance 123 and a resistance 124 may be connected across the actuating coil 121 in order to transmit a substantially unidirectional current through the actuating coil 121 during the interval of energization thereof. The actuating coil 121 is connected to be energized from the alternating current circuit 2 through transformer 28 and a current limiting resistance 125.

The timing of the relay 122 is effected by means of a capacitance 126 which is connected in series relation with the grid 127 of discharge device 120. Normally, the discharge device 120 is maintained nonconductive by virtue of the connection of the grid 127 to a point more negative in potential than its cathode. If desired, this effect may be obtained by connecting the grid 127 to a relatively negative point in a voltage divider 128 through a resistance 129. A timing switch 130 may also be connected in series relation with the grid 127 and the voltage divider 128 in order to initiate the operation. A discharge resistance 131 is connected across the terminals of the capacitance 126 to reset the circuit.

The circuit 110 may be connected to suitable means for increasing the pressure exerted by the welding electrodes on the work. As a diagrammatic illustration of such apparatus, we have chosen to show a coil 132 which is connected to be energized from a suitable source of current such as a battery 133 to increase the pressure exerted by the electrodes on the work at a definite time during the welding cycle. For example, the switch 130 may be arranged to be operated simultaneously with switches 44 and 45 to initiate the operation of circuit 109 simultaneously with the initiation of the operation of the timing circuit 27. The potentiometer 128 may be adjusted so that the pressure is increased at the beginning of the second period of energization of the welding circuit 1, that is at the beginning of the period of lower current intensity. It will be understood that the means shown for increasing the pressure is merely a diagrammatical illustration.

The operation of the embodiment of our invention shown in Fig. 1 will be explained by considering the system when it is operating to transmit alternating current to the welding circuit 1 during predetermined intervals of time, and in which the values of the current transmitted to the welding circuit 1 are different throughout the respective intervals of energization thereof. As will be well understood by those skilled in the art, the magnitude of the current transmitted to the welding circuit 1 will be increased in value as the time of initiation of arc discharges in the electric valve means 4 and 5 is advanced from a lagging position to a position more nearly in phase with the zero value at the beginning of the positive half cycles of anode-cathode voltage. Conversely, as the time of initiation of the arc discharges is retarded, the magnitude of the current transmitted to the welding circuit 1 is decreased in value.

The master timing circuit 27 generates two electrical timing quantities of different duration to control circuits 54 and 55 and thereby produces two different trains of cycles of control voltage or current of different duration. The manner in which the timing circuit 27 generates these electrical timing quantities will now be explained. With the control switches 44 and 45 in the positions shown, the capacitances 38 and 41 are short circuited and when the switches 44 and 45 are moved to the left-hand position the electric discharge device 42 will be connected in circuit with the capacitances 38 and 41 to initiate the charging of these capacitances from the output circuit of rectifier 29. The exact time at which the charging of capacitances 38 and 41 is initiated is determined by the setting of the peak voltage introduced in the grid circuit of discharge device 42 by means of the transformer 50. The time constants of the charging circuits for capacitances 38 and 41, in conjunction with voltage dividers 60 and 79, determine the duration of the timing quantities generated by circuit 27. In order to obtain timing quantities of different duration, the resistances 36 and 37, and 39 and 40 are adjusted to have different values.

The operation of the master timing circuit 27 may be explained more fully by referring to the operating characteristics shown in Fig. 2. The effect of the adjustment of the voltage dividers 60 and 79 determines the period of time during which the electric discharge devices 57 and 58, and 80 and 81 in circuits 54 and 55, respectively, are rendered conductive. Curves N and M show the relation between the time required to render discharge devices 57 and 58 non-conductive and the setting of the voltage divider 60. Curve M shows the reationship existing when the switch 61 is in the position indicated in Fig. 1, while curve N shows the relationship existing when the switch 61 is moved to the left-hand position. With a certain setting of the slider or contact of voltage divider 60, the duration of the final portion of the welding period may be adjusted to the horizontal line O, while on moving the contact downwardly the duration of the welding period may be reduced to the time indicated by the horizontal line P. On changing the switch 61 to the second position, that is to the left-hand position, it is obvious that the two time periods may, by equivalent settings of the controls, be considerably increased since the lines O and P will be extended to cut curve N.

The control circuits 54 and 55 transmit to the primary windings of transformers 70 and 82, respectively, trains of cycles of alternating voltage, the duration of the trains and the number of cycles in the respective trains being different because of the difference in length of the electrical timing quantities derived from circuit 27. Electric discharge devices 57, 58 and 80, 81 are rendered conductive by the transmission of current through resistances 36, 37 and 39, 40, respectively, upon the charging of capacitances 38 and 41 through the electric discharge device 42. During the charging of the capacitances 38 and 41 the common junctures of the resistances and the associated capacitances are lowered to effect a corresponding lowering in potential of the cathodes of electric discharge devices 57 and 80 and thereby render these discharge devices conductive by establishing a sufficient potential difference between the respective control grids and the associated cathodes. The electric discharge devices 57 and 58, and 80 and 81 in circuits 54 and 55, respectively, conduct current alternately to transmit these cycles of alternating current to transformers 70 and 82.

The electric valves 4 and 5 normally are non-conductive and are rendered conductive by the transmission of current to the immersion-ignitor control members 8. The electric valve 4, for example, is rendered conductive when either electric discharge device 11 or 12 is rendered conductive, and likewise the electric valve 5 is rendered conductive when either electric discharge device 13 or 14 is rendered conductive. To explain the operation of the system, it will be assumed that the control circuit 55 transmits a smaller number of cycles of alternating current to the transformer 82 than the number of cycles transmitted to transformer 70 by circuit 54. Furthermore, it will be assumed that control circuit 92 is adjusted so that the alternating voltages of peaked wave form which determine the time at which the electric discharge devices 11 and 14 are rendered conductive is advanced substantially with respect to the voltages of peaked wave form produced by secondary windings 107 and 108 which determine the time at which discharge devices 12 and 13 are rendered conductive. In other words, during the first interval of conduction by electric valves 4 and 5, the length of the period of energization of the welding circuit 1 is determined by the control circuit 55 through discharge devices 11 and 14, and the length of the second period of energization of the welding circuit 1 is determined by the control circuit 54 acting upon valves 12 and 13. It will be understood that during the first interval of energization of the welding circuit 1, both control circuits 54 and 55 tend to render the electric valves 4 and 5 conductive, but circuit 54 is ineffective due to the fact that its associated heat control circuit 93 is adjusted to produce a peak voltage lagging the peak voltage of circuit 92. In other words, the first discharge device of discharge devices 11, 12 and 13, 14 to be rendered conductive effects initiation of an arc discharge in the associated principal electric valves 4 and 5, respectively, and immediately upon such action the anode-cathode voltage decays to a value substantially equal to the arc drop of the valve and the second discharge device to be rendered conductive is ineffective. However, since the trains of impulses transmitted by circuit 54 exceed those transmitted by circuit 55, circuit 54 and circuit 93 assume control during an interval of time equal to the difference in length of the two electrical timing quantities derived from circuit 27. After the expiration of the timing quantity derived from voltage divider 79, control circuit 55 becomes inoperative and control circuit 54 takes over the control of the system. At that time, due to the fact that circuit 93 is adjusted to produce peak voltages retarded in phase with respect to those previously produced by circuit 92, a reduced value of current will be transmitted to the welding circuit 1. Of course, when circuit 54 takes over control, electric valves 4 and 5 are rendered conductive by means of electric discharge devices 12 and 13.

The manner in which the grid circuits 20 and 21 control electric valves 4 and 5 to transmit different amounts of current to the welding circuit 1 during predetermined different intervals may be more fully explained by considering the operating characteristics shown in Fig. 3. Curve A of Fig. 3 represents one-half cycle of anode voltage applied to one of the control valves, such as electric discharge device 12. Curve B shows the corresponding critical grid voltage for that discharge device; and curve C represents the blocking or biasing potential impressed thereon by means of transformer 22. Superimposed on the biasing potential is the releasing or firing potential represented by curve D which is derived from circuit 54 through secondary winding 72 of transformer 70. Curve E represents the resultant of the two curves C and D on which is superimposed the peaked voltage derived from secondary winding 107 of transformer 106 in circuit 93. It is evident that the amplitude of the voltage of peaked wave form must be such that it is capable of diminishing the negative bias on the grid of the discharge device 12 to a value above the critical voltage to enable the valve to become conductive at the desired instant, and it must therefore have an amplitude at least equal to the maximum difference between the curves B and E. With such an amplitude, however, if the peak voltage is advanced to a position indicated in the dotted line at G to give a large average current flow through the valve, the peak voltage will be able, even in the absence of the releasing voltage, to render the valve conductive as indicated. As a result, there is a loss of control and the electric discharge devices will remain conducting after the end of the proper conductive periods. To avoid this difficulty, the capacitance 24 and resistance 25 inserted in the grid circuits 20 and 21, in conjunction with the rectifiers 26, produce a substantially unidirectional bias. The presence of the unidirectional bias increases the precision of control. It will be understood that the magnitude of the current transmitted to the load circuit during the various intervals of energization may be adjusted or controlled by means of the heat control circuits 92 or 93.

If desired, the circuit 109 may be employed to increase the pressure exerted by the welding electrodes upon the work during a predetermined time of the welding cycle. For example, the switch 130 may be operated simultaneously with switches 44 and 45 so that the relay 122 is operated at the beginning of the second period of energization of the welding circuit 1. The relay 122 is operated to close its contacts to effect enerigzation of the coil 132 at the beginning of the second or low current intensity interval of energization. Of course, the circuit 109 may be adjusted by means of the voltage divider 128 to determine the time during the welding cycle at which this increased pressure is applied.

While we have shown and described our invention as applied to particular systems of connections and as embodying various devices diagrammatically shown, it will be obvious to those skilled in the art that changes and modifications may be made without departing from our invention, and we, therefore, aim in the appended claims to cover all such changes and modification as fall within the true spirit and scope of our invention.

What we claim as new and desire to secure by Letters Patent of the United States is:

1. In combination, an alternating current supply circuit, a welding circuit including welding electrodes and means for controlling the pressure exerted by said electrodes upon the work, electric translating apparatus connected between said circuits, excitation means for controlling said translating apparatus to transmit to said welding circuit a predetermined value of current during a predetermined number of cycles of voltage of said alternating current supply circuit and for transmitting to said welding circuit a predetermined smaller value of current during an interval of time subsequent to said first mentioned interval, and timing means energized from said supply circuit for controlling the pressure controlling means to increase the pressure exerted by said electrodes during the second mentioned interval and for controlling said excitation means to establish the above stated current-time relationship.

2. In combination, an alternating current supply circuit, a welding circuit including welding electrodes and means for controlling the pressure exerted by said electrodes upon the work, electric translating apparatus connected between said circuits for effecting energization of the welding circuit, excitation means for controlling said translating apparatus to transmit to said welding circuit a predetermined value of current during a predetermined number of cycles of voltage of said alternating current supply circuit and for transmitting to said welding circuit a predetermined different smaller value of current during a second interval of time subsequent to said first mentioned interval, and timing means for controlling the pressure controlling means to vary the pressure exerted by said electrodes during said intervals and for controlling said excitation means to establish the above stated current-time relationship.

3. In combination, an alternating current supply circuit, a load circuit including welding electrodes, pressure means for controlling the pressure exerted by said electrodes upon the work, electric translating apparatus connected between said supply circuit and said welding circuit and comprising electric valve means having a control member, means connected to said control member for controlling said electric valve means to transmit to said welding circuit current of a predetermined value during a predetermined number of half cycles of voltage of said supply circuit and for transmitting to said welding circuit a second predetermined smaller value of current during an interval of time subsequent to the first mentioned interval, and timing means energized from said supply circuit for controlling the pressure controlling means and for increasing the pressure exerted by said electrodes during the second mentioned interval.

4. In combination, an alternating current supply circuit, a welding circuit including welding electrodes, means for controlling the pressure exerted by said electrodes upon the work, electric translating apparatus connected between said supply circuit and said welding circuit and comprising a pair of reversely connected electric valve means each provided with a control member, excitation means connected to the control members for controlling the conductivity of said electric valve means and for controlling said electric valve means to transmit to said welding circuit a predetermined value of current during a predetermined number of half cycles of voltage of said supply circuit and for transmitting to said welding circuit a predetermined lower value of current during the interval of time subsequent to the first mentioned interval, and timing means for controlling the pressure controlling means and for increasing the pressure exerted by said electrodes during the second mentioned interval and for controlling said excitation means to establish the above stated current-time relationship.

5. In combination, an alternating current supply circuit, a welding circuit including welding electrodes, means for controlling the pressure exerted by said electrodes upon the work, electric translating apparatus connected between said supply circuit and said welding circuit and comprising a pair of reversely connected electric valve means each provided with a control member, excitation means connected to the control members for controlling the conductivity of said electric valve means and for transmitting to said welding circuit a predetermined value of current during a predetermined number of half cycles of voltage of said supply circuit and for transmitting to said welding circuit a predetermined lower value of current during the interval of time subsequent to the first mentioned interval, and electric valve timing means energized from said supply circuit for controlling the pressure controlling means and for increasing the pressure exerted by said electrodes during the second mentioned interval and for controlling said excitation means to establish the above stated current-time relationship.

AUSTYN L. WHITELEY.
BERTRAM G. HIGGINS.